(12) United States Patent
Suzuki (10) Patent No.: US 11,791,464 B2
(45) Date of Patent: Oct. 17, 2023

(54) CATHODE ACTIVE MATERIAL AND SECONDARY BATTERY USING SAME

(71) Applicant: Panasonic Intellectual Property Management Co., Ltd., Osaka (JP)

(72) Inventor: Hirotetsu Suzuki, Osaka (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 334 days.

(21) Appl. No.: 16/847,636

(22) Filed: Apr. 13, 2020

(65) Prior Publication Data

US 2020/0381722 A1    Dec. 3, 2020

(30) Foreign Application Priority Data

May 30, 2019  (JP) .................... 2019-101760

(51) Int. Cl.

| | | |
|---|---|---|
| *H01M 4/525* | (2010.01) | |
| *H01M 4/505* | (2010.01) | |
| *H01M 4/66* | (2006.01) | |
| *H01M 10/0525* | (2010.01) | |
| *H01M 10/0569* | (2010.01) | |
| *H01M 4/134* | (2010.01) | |
| *H01M 4/02* | (2006.01) | |

(52) U.S. Cl.
CPC ........... *H01M 4/525* (2013.01); *H01M 4/134* (2013.01); *H01M 4/505* (2013.01); *H01M 4/667* (2013.01); *H01M 10/0525* (2013.01); *H01M 10/0569* (2013.01); *H01M 2004/021* (2013.01)

(58) Field of Classification Search
CPC ...... H01M 4/525; H01M 4/134; H01M 4/505; H01M 4/667; H01M 10/0525; H01M 10/0569; H01M 2004/021; H01M 4/1391; H01M 10/052; H01M 4/62; H01M 4/366; H01M 4/485; H01M 4/5825; Y02E 60/10
See application file for complete search history.

(56) References Cited

U.S. PATENT DOCUMENTS

2007/0218359 A1*  9/2007  Shimizu ............ H01M 10/0525
                                                 429/231.1

FOREIGN PATENT DOCUMENTS

| JP | 2015-170551 | | 9/2015 | |
|---|---|---|---|---|
| JP | 2018-206669 | | 12/2018 | |
| KR | 2015-0069335 | * | 6/2015 | ............ H01M 4/525 |
| KR | 10-1700437 | * | 2/2017 | ......... C01B 2525/40 |

OTHER PUBLICATIONS

Machine translation of Kr 101700437, retrieved frim <www.espacenet.com> on Apr. 21, 2022.*
Machine translation of KR 2015-0069335, retrieved from <www.espacenet.com> on Jul. 21, 2023.*

* cited by examiner

*Primary Examiner* — Cynthia K Walls
(74) *Attorney, Agent, or Firm* — McDermott Will & Emery LLP (57) ABSTRACT

Provided is a cathode active material comprising particles each containing a lithium composite oxide; and a coating layer containing an ammonium phosphate compound and coating each of the particles.

15 Claims, 3 Drawing Sheets

CATHODE ACTIVE MATERIAL AND SECONDARY BATTERY USING SAME

BACKGROUND

1. Technical Field

The present disclosure relates to a cathode active material and a secondary battery using the same.

2. Description of the Related Art

An electrolyte liquid containing a non-aqueous solvent is referred to as a non-aqueous electrolyte. In order to improve a cycle characteristic of a secondary battery comprising a non-aqueous electrolyte, it is important to suppress a side reaction involving decomposition of the non-aqueous solvent.

In order to suppress the side reaction, various improvements have been attempted on a surface of a cathode active material that may be a reaction field of the side reaction. For example, Patent Literature 1 discloses that a particle surface of a lithium composite oxide contained in the cathode active material is coated with a solid electrolyte represented by $mLi_{1+x}Al_xTi_{2-x}(PO_4)_3 \cdot nLiOH$ to suppress the side reaction.

CITATION LIST

Patent Literature

Patent Literature 1: Japanese Patent Application Publication No. 2018-206669

SUMMARY

In a secondary battery containing a conventional cathode active material, a discharge capacity retention ratio may be significantly decreased along with repetition of a charge/discharge cycle.

The cathode active material according to one aspect of the present disclosure comprises:

particles each containing a lithium composite oxide; and
a coating layer containing an ammonium phosphate compound and coating each of the particles.

The present disclosure provides a cathode active material that suppresses a decrease in discharge capacity retention ratio of a secondary battery.

DETAILED DESCRIPTION OF THE EMBODIMENT

Hereinafter, embodiments of the present disclosure will be described with reference to the drawings. However, the present disclosure is not limited to the following embodiments.

Embodiment of Cathode Active Material

Figure 1:
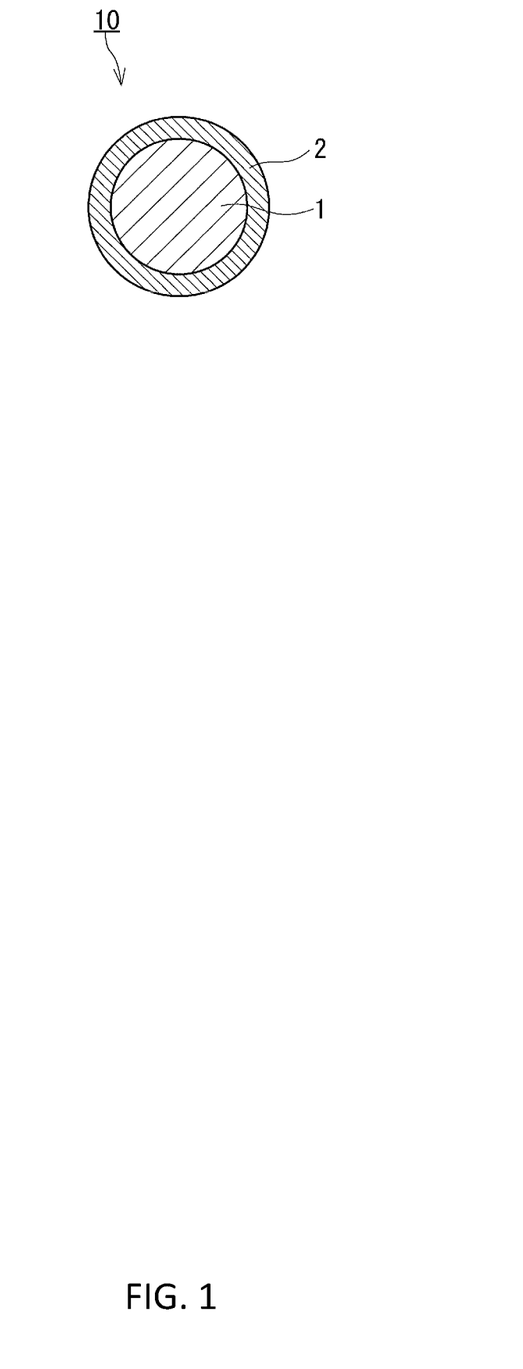
FIG. 1 is a cross-sectional view of a cathode active material according to the present embodiment.

FIG. 1 is a cross-sectional view of the cathode active material 10 according to the present embodiment. As shown in FIG. 1, the cathode active material 10 comprises a particle 1 and a coating layer 2. The coating layer 2 coats the particle 1. The coating layer 2 may coat the entire surface of the particle 1 or may partially coat the surface of the particle 1. The coating layer 2 may be in the form of a film or an island. The coating layer 2 is in direct contact with, for example, the particle 1.

The particle 1 contains a lithium composite oxide. The particle 1 may contain a lithium composite oxide as a main component. The "main component" means the most abundant component contained in the particle 1 in view of a weight ratio. The particle 1 may consist substantially of a lithium composite oxide. "Consisting essentially of a material" means excluding other components that alter the essential characteristic of the material. However, the particle 1 may contain impurities in addition to the lithium composite oxide. Since the particle 1 contains the lithium composite oxide, the cathode active material 10 can occlude and release lithium ions.

The lithium composite oxide is, for example, a metal oxide containing lithium and a transition metal. The lithium composite oxide contains, for example, at least one selected from the group consisting of nickel, cobalt, and manganese. The lithium composite oxide may contain at least one selected from the group consisting of nickel and cobalt. In other words, the lithium composite oxide may be a metal oxide containing lithium and at least one selected from the group consisting of nickel, cobalt and manganese. The lithium composite oxide may be a metal oxide containing nickel, cobalt and lithium. In the lithium composite oxide, a ratio of the number of nickel atoms to the total number of nickel, cobalt, and manganese atoms is, for example, not less than 50%.

The lithium composite oxide has, for example, a crystal structure. The crystal structure of the lithium composite oxide is not particularly limited. The lithium composite oxide has, for example, a crystal structure which belongs to a space group R-3m or C2/m. In such a lithium composite oxide, expansion and contraction of a crystal lattice generated due to charge and discharge of a secondary battery are relatively small. Therefore, the lithium composite oxide is less likely to be deteriorated in a non-aqueous electrolyte of the secondary battery. The secondary battery containing this lithium composite oxide has an excellent cycle characteristic. Further, by using the lithium composite oxide, a secondary battery in a discharged state can be assembled.

The coating layer 2 contains an ammonium phosphate compound. The coating layer 2 may contain an ammonium phosphate compound as a main component, or may substantially consist of an ammonium phosphate compound. However, the coating layer 2 may contain impurities in addition to the ammonium phosphate compound.

The ammonium phosphate compound is a salt containing a phosphate ion and an ammonium ion. In the present specification, the ammonium ion includes not only $NH_4^+$ but also a primary to tertiary ammonium ion in which at least one hydrogen atom contained in $NH_4^+$ has been substituted with a substituent. Examples of the substituent contained in the ammonium ion include a hydrocarbon group. The hydrocarbon group has, for example, one or more carbon atoms. The upper limit of the carbon number of the hydrocarbon group is not particularly limited, and is, for example, three. The hydrocarbon group may be a chain hydrocarbon group or a cyclic hydrocarbon group. The hydrocarbon group is, for example, a saturated aliphatic group. Examples of the saturated aliphatic group include a methyl group, an ethyl group, and a propyl group. The hydrogen atom contained in the hydrocarbon group may be substituted with a halogen atom such as a fluorine atom. In the ammonium phosphate compound, a part of the ammonium ion may be substituted with a lithium ion.

The ammonium phosphate compound may be a compound represented by the following formula (1).

$$Li_x(NR_4)_{3-x}PO_4 \quad (1)$$

In the formula (1), the value of x satisfies the following relational formula: $0.10 \leq x \leq 2.90$. The plurality of Rs are each independently a hydrogen atom or a saturated aliphatic group represented by a composition formula $C_\alpha H_\beta F_\gamma$. In the saturated aliphatic group, $\alpha$, $\beta$, and $\gamma$ are integers that satisfy the following relational formulas: $\alpha \geq 1$, $\beta \geq 0$, $\gamma \geq 0$, and $\beta + \gamma = 2\alpha + 1$. In the formula (1), all of Rs may be hydrogen atoms.

In the formula (1), the value of x can be identified, for example, by the following method. First, the cathode active material 10 is subjected to a thermogravimetric gas chromatography-mass spectrometry measurement (hereinafter, referred to as TG-GC/MS measurement). In the TG-GC/MS measurement, the ammonium phosphate compound contained in the cathode active material 10 is thermally decomposed to generate an $NH_3$ gas. By quantitatively analyzing the $NH_3$ gas, the amount of ammonium ions contained in the ammonium phosphate compound can be identified. The amount of the ammonium ions may be determined based on the value provided by performing the TG-GC/MS measurement of the cathode active material 10 five times. Next, the amount of phosphate ions contained in the ammonium phosphate compound is identified. The amount of the phosphate ions contained in the ammonium phosphate compound can be identified by, for example, an inductively coupled plasma (ICP) emission spectroscopy. The value of x can be calculated based on the amount of the ammonium ions and the amount of the phosphate ions contained in the ammonium phosphate compound.

The value of x in the formula (1) is varied, depending on, for example, a ratio of the weight of the ammonium phosphate compound contained in the coating layer 2 to the weight of the lithium composite oxide contained in the particle 1. As the ratio is lower, the value of x tends to be increased. On the other hand, as the ratio is higher, the value of x tends to be decreased. The value of x may be varied, depending on a condition and a surrounding environment when the coating layer 2 of the cathode active material 10 is produced.

A ratio A of the weight of the ammonium phosphate compound contained in the coating layer 2 to the weight of the lithium composite oxide contained in the particle 1 is not particularly limited. The ratio A may be not less than 0.2 wt % and not less than 1.0 wt % from the viewpoint of sufficiently suppressing a side reaction between the lithium composite oxide and the non-aqueous solvent contained in the secondary battery. However, if the ratio A is too high, migration of the lithium ions between the lithium composite oxide and the non-aqueous solvent may be inhibited. In other words, if the ratio A is too high, the ammonium phosphate compound functions as a resistance component, and the discharge capacity of the secondary battery may be decreased. Therefore, the ratio A may be not more than 2.0 wt %, or may be not more than 1.8 wt %. The ratio A may be not less than 0.2 wt % and not more than 1.8 wt %, or may be not less than 1.0 wt % and not more than 1.8 wt %.

The shape of the cathode active material 10 is, for example, particulate. As used herein, the term "particulate" includes shapes of a sphere, an ellipsoid, a scale, and a fiber. The average particle size of the cathode active material 10 is, for example, not less than 5 μm and not more than 50 μm. The average particle size of the cathode active material 10 means a particle size (D50) which corresponds to a cumulative volume percentage of 50% in a particle size distribution measured by a laser diffraction scattering method.

The cathode active material 10 can be produced, for example, by the following method. First, a solution containing materials of the coating layer 2 is prepared. The solvent of the solution is, for example, water. Next, the solution is applied to the particle 1. For example, the solution can be applied to the particle 1 by mixing the solution with the particle 1. Next, the cathode active material 10 can be produced by drying the particle 1 to which the solution has been applied.

In a secondary battery containing a conventional cathode active material, a side reaction between the lithium composite oxide contained in the cathode active material and the non-aqueous solvent contained in the non-aqueous electrolyte proceeds during the charge of the secondary battery. Specifically, as the cathode potential is increased by the charge of the secondary battery, the reductant ability of the lithium composite oxide is raised. In this way, the transition metal contained in the lithium composite oxide is reduced and eluted into the non-aqueous electrolyte. On the other hand, in the non-aqueous electrolyte, a part of the non-aqueous solvent is oxidized and decomposed.

On the other hand, in the cathode active material 10 of the present embodiment, the surface of the particle 1 is provided with insulation by the ammonium phosphate compound contained in the coating layer 2. The coating layer 2 prevents (namely, suppresses) the transition metal contained in the lithium composite oxide from being reduced and eluted. In particular, the coating layer 2 can also prevent (namely, suppress) nickel, cobalt, and manganese, which are easily eluted from the lithium composite oxide into the non-aqueous electrolyte, from being eluted. Since the transition metal (e.g., nickel, cobalt, and manganese) is prevented from being reduced and eluted, the oxidative decomposition of the non-aqueous solvent is also suppressed. By suppressing the oxidative decomposition of the non-aqueous solvent, a decrease in the discharge capacity retention ratio of the secondary battery is suppressed. Thus, the cathode active material 10 of the present embodiment improves the cycle characteristic of the secondary battery.

Embodiment of Secondary Battery

Figure 2:
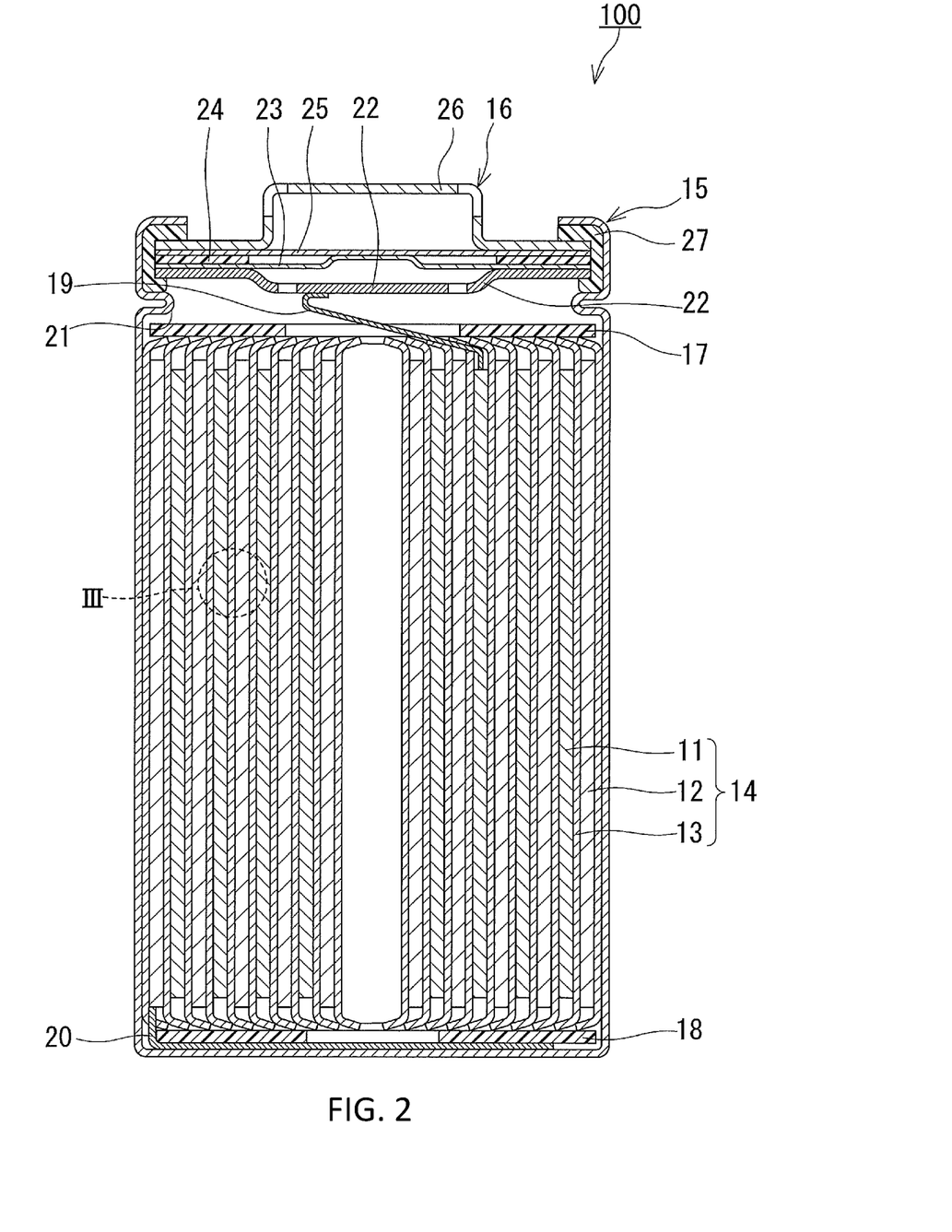
FIG. 2 is a vertical cross-sectional view schematically showing a secondary battery containing the cathode active material of the present disclosure.

FIG. 2 is a vertical cross-sectional view schematically showing the secondary battery 100 comprising the cathode active material of the present disclosure. As shown in FIG. 2, the secondary battery 100 is a cylindrical battery comprising a cylindrical battery case, a rolled electrode group 14, and a non-aqueous electrolyte (not shown). The electrode group 14 is stored in the battery case and is in contact with the non-aqueous electrolyte.

The battery case is composed of a case body 15 that is a bottomed cylindrical metal container, and a sealing body 16 that seals an opening of the case body 15. A gasket 27 is disposed between the case body 15 and the sealing body 16. The gasket 27 ensures the sealing of the battery case. In the case body 15, insulating plates 17 and 18 are respectively disposed at both ends of the electrode group 14 in a rolling axis direction of the electrode group 14.

The case body 15 has, for example, a recess portion 21. The recess portion 21 can be formed by partially pressing the side wall of the case body 15 from the outside thereof. The recess portion 21 may be formed in an annular shape along the circumferential direction of an imaginary circle defined by the case body 15 on the side wall of the case body 15. In this case, the sealing body 16 is supported by a surface of an upper part of the recess portion 21, for example.

The sealing body 16 comprises a filter 22, a lower valve body 23, an insulation member 24, an upper valve body 25, and a cap 26. In the sealing body 16, these members are stacked in this order. The sealing body 16 is attached to the opening of the case body 15 in such a manner that the cap 26 is located outside the case body 15 and that the filter 22 is located inside the case body 15.

Each of the above members forming the sealing body 16 is, for example, disk-shaped or ring-shaped. The above members other than the insulation member 24 are electrically connected to each other.

The electrode group 14 has a cathode 11, an anode 12, and a separator 13. Each of the cathode 11, the anode 12, and the separator 13 is strip-shaped. The width directions of the strip-shaped cathode 11 and the anode 12 are parallel to the rolling axis of the electrode group 14, for example. The separator 13 is disposed between the cathode 11 and the anode 12. The cathode 11 and the anode 12 are rolled spirally in a state where a separator 13 is provided between these electrodes.

When the cross section of the secondary battery 100 in the direction perpendicular to the rolling axis of the electrode group 14 is observed, the cathode 11 and the anode 12 are stacked alternately in a radial direction of an imaginary circle defined by the case body 15 in a state where the separator 13 is provided between these electrodes.

The cathode 11 is electrically connected to the cap 26 that doubles as a cathode terminal through a cathode lead 19. One end of the cathode lead 19 is connected to, for example, the vicinity of the center of the cathode 11 in the length direction of the cathode 11. The cathode lead 19 extends through a through hole formed in the insulating plate 17 from the cathode 11 to a filter 22. The other end of the cathode lead 19 is welded onto, for example, the lower surface of the filter 22.

The anode 12 is electrically connected to the case body 15 that doubles as an anode terminal via an anode lead 20. One end of the anode lead 20 is connected to, for example, the end of the anode 12 in the length direction of the anode 12. The other end of the anode lead 20 is welded onto, for example, the inner bottom surface of the case body 15.

Hereinafter, the configuration of the secondary battery 100 will be specifically described. In the secondary battery 100 of the present embodiment, known materials can be used without particular limitation, except for the cathode active material.

[Cathode 11]

Figure 3:
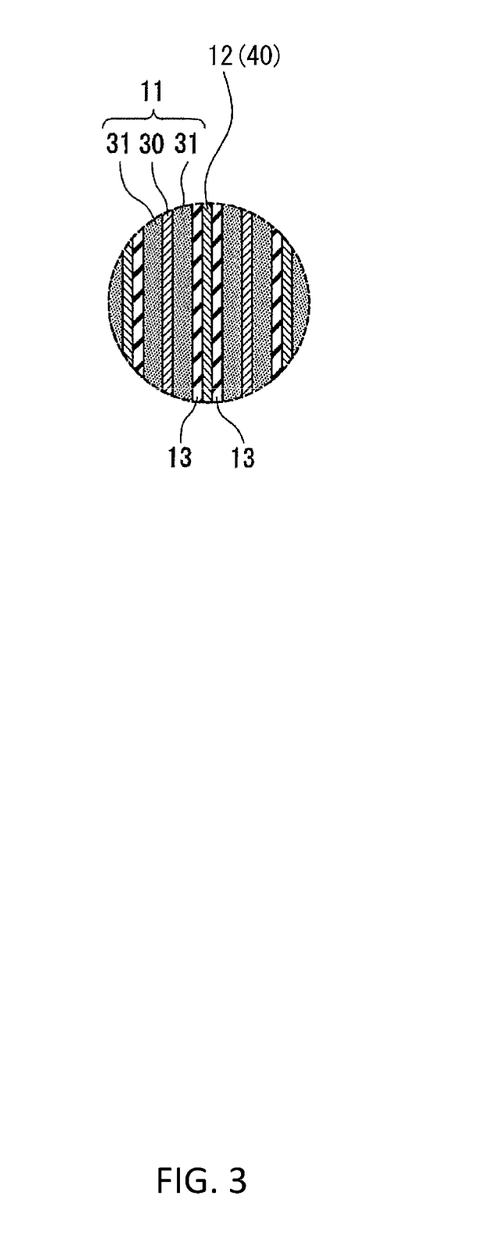
FIG. 3 is an enlarged view of the region III shown in FIG. 2.

FIG. 3 is an enlarged view of the region III shown in FIG. 2. As shown in FIG. 3, the cathode 11 has, for example, a cathode current collector 30 and a cathode mixture layer 31. Each of the cathode current collector 30 and the cathode mixture layer 31 has, for example, strip-shaped. The cathode current collector 30 has, for example, a pair of principal surfaces which face each other. The "principal surface" means a surface having the widest area of the cathode current collector 30. The cathode mixture layer 31 is formed on, for example, the cathode current collector 30, and is disposed on the surface of the cathode current collector 30. For example, the cathode current collector 30 is in direct contact with the cathode mixture layer 31. As shown in FIG. 3, in the cathode 11, two cathode mixture layers 31 may be formed on the pair of the principal surfaces of the cathode current collector 30, respectively. However, in the cathode 11, only one cathode mixture layer 31 may be formed on one principal surface of the cathode current collector 30. In the cathode 11, the cathode mixture layer 31 may be formed only on one principal surface of the cathode current collector 30 in at least one selected from the group consisting of the region connected to the cathode lead 19 and the region which does not face the anode 12.

Examples of the material of the cathode current collector 30 include a metal material. Examples of the metal material include stainless steel, iron, copper, and aluminum.

The cathode mixture layer 31 contains the above-described cathode active material as an essential component. The cathode mixture layer 31 may contain the cathode active material as a main component. The content ratio of the cathode active material in the cathode mixture layer 31 is, for example, not less than 80 wt % and not more than 99.5 wt %. The cathode mixture layer 31 may further contain at least one selected from the group consisting of a conductive material and a binder as an optional component. The cathode mixture layer 31 may contain an additive other than the conductive material and the binder, if necessary.

The conductive material includes, for example, a carbon material. Examples of the carbon material include carbon black, carbon nanotube, and graphite. Examples of the carbon black include acetylene black and ketjen black. The cathode mixture layer 31 may contain one or more kinds of the conductive materials. Examples of the binder include fluororesin, polyacrylonitrile resin, polyimide resin, acrylic resin, polyolefin resin, and rubbery polymer. Examples of the fluororesin include polytetrafluoroethylene and polyvinylidene fluoride. The cathode mixture layer 31 may contain one or more kinds of the binders.

A layer containing a conductive carbon material may be disposed between the cathode current collector 30 and the cathode mixture layer 31, if necessary. Examples of the carbon material include the materials described above for the conductive material.

The cathode 11 can be produced, for example, by the following method. First, a slurry containing the material of the cathode mixture layer 31 and a dispersion medium is prepared. As the dispersion medium, at least one selected from the group consisting of water and an organic medium can be used. Next, the slurry is applied to the surface of the cathode current collector 30 to provide a film. The cathode 11 can be produced by drying the provided film, and then, pressing it with a roller. If the cathode 11 has a layer containing the carbon material, the layer containing the carbon material is produced prior to the production of the cathode mixture layer 31. The layer containing the carbon material can be produced, for example, by the following method. First, a dispersion liquid containing the carbon material is prepared. The dispersion liquid is applied to the surface of the cathode current collector 30 to provide a film. The provided film is dried to produce the layer containing the carbon material.

[Anode 12]

The anode 12 comprises an anode current collector 40. As shown in FIG. 3, in the secondary battery 100 in a discharged state, the anode 12 is composed only of the anode current collector 40, for example. At this time, the secondary battery 100 is easy to ensure a high volume energy density. In the present disclosure, the discharged state means a state where the secondary battery 100 has been discharged until a state of charge (i.e., SOC) of the secondary battery 100 reaches not more than $0.05 \times C$ (where C is defined as a rated capacity of the secondary battery 100). The discharged state means a state, for example, that the secondary battery 100 has been discharged until the voltage of the secondary battery 100 reaches a lower limit voltage thereof at a constant current of 0.05 C. The lower limit voltage of the secondary battery 100 is, for example, 2.5V.

The anode current collector 40 is usually composed of a conductive sheet. The material of the anode current collector 40 may be a metal material such as a metal or an alloy. Examples of the metal material include a lithium metal and a lithium alloy. The anode current collector 40 may be composed of a lithium metal or a lithium alloy. The metal material may be a material that does not react with lithium. Such materials include materials that do not react with at least one selected from the group consisting of a lithium metal and lithium ions. More specifically, the metal material may be a material that does not form an alloy or an intermetallic compound with lithium. Examples of such metal materials include copper, nickel, iron, and alloys containing these metal elements. The alloy may be a copper alloy or stainless steel. From the viewpoint of having high conductivity and easily improving the capacity and charge/discharge efficiency of the secondary battery 100, the metal material may be copper or an alloy thereof. The anode current collector 40 may contain one or more kinds of these metal materials. The anode current collector 40 may contain a conductive material other than the metal material.

As the anode current collector 40, a foil or a film is used. The anode current collector 40 may be porous. From the viewpoint of easily ensuring high conductivity, the anode current collector 40 may be a metal foil (e.g., a metal foil containing copper). Examples of the metal foil containing copper are a copper foil and a copper alloy foil. The copper content ratio in the metal foil may be not less than 50 wt %, or not less than 80 wt %. In particular, the metal foil may be a copper foil containing substantially only copper as a metal. The anode current collector 40 has a thickness of, for example, not less than 5 μm and not more than 20 μm.

In the secondary battery 100 in the discharged state, if the anode 12 is composed only of the anode current collector 40, a lithium metal is deposited on the anode 12 when the secondary battery 100 is charged. Specifically, when the secondary battery 100 is charged, lithium ions contained in the non-aqueous electrolyte receive electrons from the anode 12. As a result, the lithium ions are changed into a lithium metal and the lithium metal is deposited on the anode current collector 40. The lithium ions contained in the non-aqueous electrolyte may be ions derived from a lithium salt added to the non-aqueous electrolyte, or may be ions supplied from the cathode active material by charging the secondary battery 100. The lithium ions contained in the non-aqueous electrolyte may be a mixture of the ions derived and supplied therefrom. The deposited lithium metal is changed into lithium ions by the discharge of the secondary battery 100 and is dissolved in the non-aqueous electrolyte.

In the secondary battery 100 in a discharged state, the anode 12 may further comprise an anode active material layer disposed on the surface of the anode current collector 40. The anode active material layer contains an anode active material. As the anode active material, an anode active material used for a known lithium ion battery can be used. Examples of the anode active material include a lithium metal, a lithium alloy, and a material capable of reversibly occluding and releasing lithium ions. Examples of the lithium alloy include a lithium-aluminum alloy.

Examples of the material capable of reversibly occluding and releasing the lithium ions include a carbon material and an inorganic material. Examples of the carbon material include graphite, soft carbon, hard carbon, and amorphous carbon. The inorganic material includes, for example, at least one selected from the group consisting of silicon and tin. Examples of the inorganic material include a silicon simple substance, a silicon alloy, a silicon compound, a tin simple substance, a tin alloy, and a tin compound. Each of the silicon compound and the tin compound may be at least one selected from the group consisting of an oxide thereof and a nitride thereof.

The anode active material layer may further contain a binder. As the binder, the material described above for the cathode mixture layer 31 can be used. The anode active material layer may further contain at least one selected from the group consisting of a conductive agent, a thickener, and another additive in addition to the anode active material and the binder. The thickness of the anode active material layer is not particularly limited, and is, for example, not less than 30 μm and not more than 300 μm in the discharged secondary battery 100.

A method for forming the anode active material layer is not particularly limited. The anode active material layer can be produced, for example, by depositing the anode active material on the surface of the anode current collector 40 using a vapor phase method such as an electrodeposition method or a vapor deposition method. The anode active material layer can also be produced by applying an anode mixture containing the anode active material and the binder to the surface of the anode current collector 40. The anode mixture may contain a material other than the anode active material and the binder, if necessary.

If the anode active material layer contains a material capable of occluding and releasing lithium ions, the anode active material layer occludes lithium ions during the charge of the secondary battery 100. Next, during the discharge of the secondary battery 100, the anode active material layer releases the lithium ions.

The anode 12 may further comprise a protection layer. The protection layer is formed, for example, on the surface of the anode current collector 40. If the anode 12 has the anode active material layer, the protection layer may be formed on the surface of the anode active material layer. The protection layer allows the reaction on the surface of the anode 12 to proceed more uniformly. For example, the protection layer facilities the lithium metal to be deposited further uniformly on the anode 12.

As the material for the protection layer, a material that does not inhibit the conduction of the lithium ions is used. The protection layer is composed of, for example, at least one selected from the group consisting of an organic material and an inorganic material. Examples of the organic material include a polymer having lithium ion conductivity. Examples of such a polymer include polyethylene oxide and polymethyl methacrylate. Examples of the inorganic material include ceramics and a solid electrolyte. Examples of the material of the ceramics include $SiO_2$, $Al_2O_3$ and MgO.

The solid electrolyte forming the protection layer is not particularly limited. Examples of the solid electrolyte include a sulfide solid electrolyte, a phosphoric acid solid electrolyte, a perovskite solid electrolyte, and a garnet solid electrolyte. From the viewpoint of relatively low cost and easy availability, it is preferable that the solid electrolyte is at least one selected from the group consisting of a sulfide solid electrolyte and a phosphoric acid solid electrolyte.

The sulfide solid electrolyte is not particularly limited, as long as the sulfide solid electrolyte is a solid electrolyte containing a sulfur component and having lithium ion conductivity. The sulfide solid electrolyte may contain, for example, S, Li, and other elements other than these. Examples of the other elements include at least one selected from the group consisting of P, Ge, B, Si, I, Al, Ga, and As. Examples of the sulfide solid electrolyte include $Li_2S$—$P_2S_5$, $70Li_2S$-$30P_2S_5$, $80Li_2S$-$20P_2S_5$, $Li_2S$—$SiS_2$, and $LiGe_{0.25}P_{0.75}S_4$.

The phosphoric acid solid electrolyte is not particularly limited, as long as the phosphoric acid solid electrolyte is a solid electrolyte containing a phosphoric acid component and having lithium ion conductivity. Examples of the phosphoric acid solid electrolyte are $Li_{1+x}Al_xTi_{2-x}(PO_4)_3$ and $Li_{1+x}Al_xGe_{2-x}(PO_4)_3$. In the composition formula, the mathematical formula $0<X<2$ is satisfied. The mathematical formula $0<X\leq1$ may be satisfied. An example of $Li_{1+x}Al_xTi_{2-x}(PO_4)_3$ is $Li_{1.5}Al_{0.5}Ti_{1.5}(PO_4)_3$.

[Separator 13]

The separator 13 has, for example, properties of ion permeability and electrical insulation. For example, a porous sheet is used as the separator 13. Examples of the separator 13 include a microporous film, a woven fabric, and a nonwoven fabric. The material of the separator 13 is not particularly limited, and may be a polymer material.

Examples of the polymer material include olefin resin, polyamide resin, and cellulose. The olefin resin may contain a polymer containing, as a monomer unit, at least one selected from the group consisting of ethylene and propylene. This polymer may be a homopolymer or a copolymer. Examples of this polymer include polyethylene and polypropylene.

The separator 13 may further contain an additive in addition to the polymer material, if necessary. An example of the additive is an inorganic filler.

[Non-Aqueous Electrolyte]

The non-aqueous electrolyte contains a non-aqueous solvent and a lithium salt. The lithium salt is dissolved in the non-aqueous solvent. The non-aqueous solvent is not particularly limited. Examples of the non-aqueous solvent include a cyclic carbonate ester, a chain carbonate ester, a cyclic carboxylic acid ester, a chain carboxylic acid ester, a chain ether, and a chain nitrile. Cyclic carbonate ester, chain carbonate ester, and carboxylic acid esters are compounds that are easily oxidatively decomposed. For the cathode active material of the present embodiment, a non-aqueous solvent containing a compound that is easily oxidatively decomposed can be used.

Examples of the cyclic carbonate ester include ethylene carbonate, propylene carbonate, butylene carbonate, vinylene carbonate, vinyl ethylene carbonate, and derivatives in which a part of hydrogen atoms contained in these compounds has been substituted with a fluoro group. Examples of the derivative having the fluoro group include fluoroethylene carbonate and trifluoropropylene carbonate.

Examples of the chain carbonate ester include dimethyl carbonate, ethyl methyl carbonate, diethyl carbonate, and derivatives in which a part of hydrogen atoms contained in these compounds has been substituted with a fluoro group. Examples of the derivative having the fluoro group include fluorodimethyl carbonate and trifluoroethyl methyl carbonate.

Examples of the cyclic carboxylic acid ester include γ-butyrolactone, γ-valerolactone, and derivatives in which a part of hydrogen atoms contained in these compounds has been substituted with a fluoro group.

Examples of the chain carboxylic acid ester include methyl acetate, ethyl acetate, propyl acetate, methyl dimethyl acetate, methyl trimethyl acetate, methyl propionate, ethyl propionate, propyl propionate, and derivatives in which a part of hydrogen atoms contained in these compounds has been substituted with a fluoro group. Examples of the derivative having the fluoro group include trifluoroethyl acetate and methyl trifluoropropionate.

The non-aqueous solvent may contain one or more kinds of the above compounds.

Examples of the lithium salts include $LiClO_4$, $LiBF_4$, $LiPF_6$, $LiN(SO_2F)_2$, $LiN(SO_2CF_3)_2$, a lithium bis(oxalate) borate (abbreviated as LiBOB), and a lithium difluoro (oxalate) borate (abbreviated as LiDFOB). The lithium salt may include at least one selected from the group consisting of, for example, $LiBF_4$, $LiPF_6$, $LiN(SO_2CF_3)_2$, $LiN(SO_2F)_2$, LiBOB, and LiDFOB. From the viewpoint of further improving the ionic conductivity of the non-aqueous electrolyte, the lithium salt may contain at least one selected from the group consisting of $LiBF_4$, $LiPF_6$, $LiN(SO_2F)_2$, and LiDFOB. The concentration of the lithium salt in non-aqueous electrolyte is not specifically limited, and is, for example, not less than 0.5 mol/L and not more than 3.5 mol/L.

The non-aqueous electrolyte may further contain an additive. A film may be formed on the anode 12 with the additive. By forming the film derived from the additive on the anode 12, the charge/discharge reaction of the secondary battery 100 easily proceeds more uniformly. As a result, in the secondary battery 100, a high discharge capacity is ensured, and the decrease in the cycle characteristic is further suppressed. Examples of such additives include vinylene carbonate, fluoroethylene carbonate, and vinyl ethylene carbonate. The additive may contain one or more kinds of these compounds.

[Others]

In the present disclosure, the cylindrical secondary battery 100 comprising a cylindrical battery case has been described. However, the secondary battery 100 of the present embodiment is not limited to the above. The secondary battery 100 may be, for example, a prismatic battery including a rectangular battery case or a stacking structure battery comprising an outer package such as a stacking structure sheet containing aluminum. The outer package of the stacking structure battery may contain a resin. Similarly, the electrode group 14 does not have to be rolled-shaped. The electrode group 14 may be a stacked electrode group in which a plurality of cathodes and a plurality of anodes are alternately stacked via separators.

EXAMPLES

Hereinafter, the embodiment of the present disclosure will be described more specifically on the basis of the following examples. However, the present disclosure is not limited to the following examples.

Comparative Examples 1 to 3 and Inventive Examples 1 to 9

[Production of Secondary Battery]

Secondary batteries each having the structure shown in FIG. 2 was produced by the following procedure.

(1) Cathode Active Material

First, particles each formed of a lithium composite oxide represented by $Li_{1.2}Ni_{0.133}Co_{0.133}Mn_{0.533}O_2$ were prepared. In the comparative examples 1 to 3, the particles were used as a cathode active material. In the inventive examples 1 to 9, the particles used in the comparative Examples 1 to 3 were coated with triammonium phosphate. Specifically, triammonium phosphate was dissolved in pure water in such a manner that the ratio A of the weight of the triammonium phosphate to the weight of the lithium composite oxide was adjusted to the values shown in Table 1. In this way, an aqueous solution of triammonium phosphate was prepared. Next, the aqueous solution of the triammonium phosphate and the lithium composite oxide particles were added to an agate mortar and kneaded. At this time, the water contained in the triammonium phosphate aqueous solution was evaporated, and triammonium phosphate was precipitated. In this way, each of the particles of the lithium composite oxide was coated with the triammonium phosphate. The provided particles were dried at 105° C. for 12 hours under vacuum to provide the cathode active material.

(2) Cathode

The cathode active material provided in the above section (1), acetylene black as a conductive material, and polyvinylidene fluoride as a binder were mixed at a mass ratio of 100:3:1. An appropriate amount of N-methyl-2-pyrrolidone was added to the provided mixture as a dispersion medium. A cathode mixture slurry was prepared by stirring the mixture and the dispersion medium.

Next, aluminum foil was prepared as a cathode current collector. The cathode mixture slurry was applied to both of a pair of principal surfaces of the aluminum foil. The provided coating films were dried to provide a dried product. Next, the dried product was compressed in the thickness direction of the dried product using a roller. In this way, a stacking structure was provided. By cutting the provided stacking structure into a predetermined size, a cathode having cathode mixture layers on both of the pair of the principal surfaces of the cathode current collector was provided. The cathode mixture layers were not formed in a part of the principal surfaces of the cathode current collector. In the part where the cathode mixture layers were not formed, the part of the principal surfaces of the cathode current collector was exposed to the outside thereof. In the part, one end of a cathode lead formed of aluminum was attached to the cathode current collector by welding.

(3) Anode

An anode was produced by cutting electrolytic copper foil having a thickness of 12 μm into a predetermined size.

(4) Non-Aqueous Electrolyte

First, a non-aqueous solvent and a lithium salt shown in Table 1 were prepared. The non-aqueous solvent was a mixture of two compounds. Table 1 also shows a volume ratio of the two compounds in the non-aqueous solvent. Next, the lithium salt was dissolved in a non-aqueous solvent to provide a liquid non-aqueous electrolyte. The concentration of the lithium salt in the non-aqueous electrolyte was 1.0 mol/L. The non-aqueous solvent and the lithium salt shown in Table 1 are as follows.

Non-Aqueous Solvent
(a) FEC: fluoroethylene carbonate
(b) DMC: dimethyl carbonate
(c) MA: methyl acetate Lithium Salt
(d) $LiPF_6$: lithium hexafluorophosphate
(e) LiFSI: lithium bissulfonylimide (5) Secondary Battery In an inert gas atmosphere, the cathode provided in the section (2) and the anode provided in the section (3) were stacked so as to provide a separator between the cathode and the anode. As the separator, a polyethylene microporous film was used. Specifically, the cathode, the separator, the anode, and another separator were stacked in this order to provide a stacking structure. The provided stacking structure was rolled spirally to provide an electrode group. The provided electrode group was inserted into a bag-shaped outer package. The outer package was composed of a stacking structure sheet having an Al layer. Next, a non-aqueous electrolyte was injected into the outer package, and the outer package was sealed. In this way, the secondary batteries of the comparative examples 1 to 3 and the inventive examples 1 to 9 were provided.

[Evaluation of Secondary Battery]

Each of the provided secondary batteries was subjected to a charge/discharge test in accordance with the following procedure to evaluate a discharge capacity and a cycle characteristic of each of the secondary batteries.

First, the secondary battery was charged in a constant temperature bath maintained at 25° C. Next, the secondary battery was left at rest for 20 minutes, and then, the secondary battery was discharged. The conditions for charging and discharging the secondary battery are as follows.

(Charge)

First, a constant current charge was performed at a current of 10 mA per square centimeter of an electrode area. The constant current charge was performed until the battery voltage of the secondary battery reached 4.7V. Next, a constant voltage charge was performed at a voltage of 4.7V. The constant voltage charge was performed until the current value per square centimeter of the electrode area reached 1 mA.

(Discharge)

A constant current discharge was performed at a current of 10 mA per square centimeter of the electrode area. The constant current discharge was performed until the battery voltage of the secondary battery reached 2.5V.

The above charge and discharge are defined as one cycle. In the charge/discharge test, the above charge and discharge were performed for 60 cycles. The discharge capacity of the secondary battery in the first cycle is defined as an initial discharge capacity. The ratio of the discharge capacity of the secondary battery at the 60th cycle to the initial discharge capacity is defined as a discharge capacity retention ratio (%). The discharge capacity retention ratio can be used as an index of the cycle characteristic of the secondary battery. Table 1 shows evaluation results of the secondary batteries of the comparative examples 1 to 3 and the inventive examples 1 to 9. Table 1 also shows the non-aqueous solvent, the lithium salt, and the concentration of the lithium salt used for the non-aqueous electrolyte.

TABLE 1

| | Ratio A (wt %) | Non-aqueous solvent | Lithium salt | Concentration of Lithium salt (mol/l) | Initial discharge capacity mAh/g 0.2 C | Discharge capacity retention ratio at $60^{th}$ cycle (%) |
|---|---|---|---|---|---|---|
| Comparative Example 1 | 0 | FEC/DMC 2/8 (v/v) | $LiPF_6$ | 1.0 | 254.3 | 88.3 |

TABLE 1-continued

| | Ratio A (wt %) | Non-aqueous solvent | Lithium salt | Concentration of Lithium salt (mol/l) | Initial discharge capacity mAh/g 0.2 C | Discharge capacity retention ratio at $60^{th}$ cycle (%) |
|---|---|---|---|---|---|---|
| Comparative Example 2 | 0 | FEC/MA 2/8 (v/v) | $LiPF_6$ | 1.0 | 254.6 | 81.1 |
| Comparative Example 3 | 0 | FEC/DMC 2/8 (v/v) | LiFSI | 1.0 | 254.5 | 86.3 |
| Inventive Example 1 | 0.2 | FEC/DMC 2/8 (v/v) | $LiPF_6$ | 1.0 | 254.2 | 90.1 |
| Inventive Example 2 | 0.4 | FEC/DMC 2/8 (v/v) | $LiPF_6$ | 1.0 | 254.1 | 92.2 |
| Inventive Example 3 | 0.5 | FEC/DMC 2/8 (v/v) | $LiPF_6$ | 1.0 | 254.2 | 94.7 |
| Inventive Example 4 | 1.0 | FEC/DMC 2/8 (v/v) | $LiPF_6$ | 1.0 | 254.1 | 97.7 |
| Inventive Example 5 | 1.0 | FEC/MA 2/8 (v/v) | $LiPF_6$ | 1.0 | 254.5 | 97.5 |
| Inventive Example 6 | 1.0 | FEC/DMC 2/8 (v/v) | LiFSI | 1.0 | 254.4 | 97.1 |
| Inventive Example 7 | 1.5 | FEC/DMC 2/8 (v/v) | $LiPF_6$ | 1.0 | 254.2 | 98.1 |
| Inventive Example 8 | 1.8 | FEC/DMC 2/8 (v/v) | $LiPF_6$ | 1.0 | 250.0 | 98.2 |
| Inventive Example 9 | 2.0 | FEC/DMC 2/8 (v/v) | $LiPF_6$ | 1.0 | 223.5 | 102.1 |

As is clear from the comparison of the inventive examples 1 to 9 to the comparative examples 1 to 3, if each of the particles containing the lithium composite oxide was coated with the coating layer containing an ammonium phosphate compound in the cathode active material, the decrease in the discharge capacity retention ratio was sufficiently suppressed in the secondary battery containing the active material. In other words, in the secondary battery containing the cathode active material, the cycle characteristic was improved.

As can be seen from the comparison of the comparative example 1 to the comparative example 2, the non-aqueous solvent containing a carboxylate ester tended to lower the discharge capacity retention ratio of the secondary battery, as compared to the non-aqueous solvent containing a carbonate ester. However, as can be seen from the comparison of the inventive example 4 to the inventive example 5, the cathode active material of the present embodiment realized a high discharge capacity retention ratio, even if the non-aqueous solvent contained a carboxylic acid ester.

As is clear from the inventive examples 1 to 9, as the ratio A of the weight of the ammonium phosphate compound to the weight of the lithium composite oxide was increased, the discharge capacity retention ratio of the secondary battery was improved.

Further, as is clear from the comparison between the inventive examples 1 to 8 to the inventive example 9, if the ratio A of the weight of the ammonium phosphate compound to the weight of the lithium composite oxide is not less than 2.0% by weight, the initial discharge capacity of the secondary battery was decreased. Therefore, the ratio A may be not less than 0.2 wt % and not more than 1.8 wt % from the viewpoint of the initial discharge capacity of the secondary battery. Furthermore, as can be seen from the inventive examples 4 to 9, if the ratio A was not less than 1.0 wt %, the secondary battery has a particularly high discharge capacity retention ratio. In the inventive example 9, the discharge capacity retention ratio of the secondary battery exceeded 100%. From these results, it is conceivable that, in the inventive example 9, the charge/discharge cycle was repeated to change the macrostructure of the coating layer in such a manner that lithium ions were allowed to be moved relatively easily inside the coating layer.

INDUSTRIAL APPLICABILITY

The cathode active material according to the present disclosure can improve a cycle characteristic of a secondary battery. Therefore, the secondary battery containing the cathode active material according to the present disclosure is useful for various applications such as electronic devices such as mobile phones, smartphones, and tablet terminals, electric vehicles such as hybrid vehicles and plug-in hybrid vehicles, and home storage batteries combined with solar cells.

REFERENTIAL SIGNS LIST

1 Particle
2 Coating layer
10 Cathode active material
11 Cathode
12 Anode
13 Separator
14 Electrode group
15 Case body
16 Sealing body
17, 18 Insulating plate
19 Cathode lead
20 Anode lead
21 Recess portion
22 Filter
23 Lower valve body
24 Insulation member
25 Upper valve body
26 Cap
27 Gasket
30 Cathode current collector 31 Cathode mixture layer
40 Anode current collector
100 Secondary battery

The invention claimed is:

1. A cathode active material comprising:
particles each containing a lithium composite oxide; and
a coating layer containing an ammonium phosphate compound and coating each of the particles,
wherein the ammonium phosphate compound is represented by a formula $Li_x(NR_4)_{3-x}PO_4$ a salt containing a phosphate ion and an ammonium ion, where $0.10 \leq x \leq 2.90$, each R is independently a hydrogen atom or a saturated aliphatic group represented by a composition formula $C_\alpha H_\beta F_\gamma$, $\alpha$, $\beta$, and $\gamma$ are integers that satisfy the following relational formulas: $\alpha \geq 1$, $\beta \geq 0$, $\gamma \geq 0$, and $\beta + \gamma = 2\alpha + 1$, and at least one R is the saturated aliphatic group.

2. The cathode active material according to claim 1, wherein
a weight ratio of the ammonium phosphate compound to the lithium composite oxide is not less than 0.2 wt % and not more than 1.8 wt %.

3. The cathode active material according to claim 2, wherein
the weight ratio of the ammonium phosphate compound to the lithium composite oxide is not less than 1.0 wt % and not more than 1.8 wt %.

4. The cathode active material according to claim 1, wherein
the lithium composite oxide contains at least one selected from the group consisting of nickel, cobalt, and manganese.

5. The cathode active material according to claim 1, wherein
the lithium composite oxide has a crystal structure which belongs to a space group R-3m or C2/m.

6. A secondary battery, comprising:
a cathode comprising the cathode active material according to claim 1;
an anode comprising an anode active material capable of occluding and releasing lithium ions; and
a non-aqueous electrolyte containing a non-aqueous solvent and a lithium salt which has been dissolved in the non-aqueous solvent.

7. A secondary battery, comprising:
a cathode containing a cathode mixture layer containing a cathode current collector and the cathode active material according to claim 1;
an anode comprising an anode current collector; and
a non-aqueous electrolyte containing a non-aqueous solvent and a lithium salt which has been dissolved in the non-aqueous solvent,
wherein
during charge, a lithium metal is deposited on the anode current collector; and
during discharge, the lithium metal is dissolved in the non-aqueous electrolyte.

8. The secondary battery according to claim 6, wherein
the lithium salt contains at least one selected from the group consisting of $LiBF_4$, $LiPF_6$, $LiN(SO_2CF_3)_2$, $LiN(SO_2F)_2$, a lithium bis(oxalate) borate, and a lithium difluoro(oxalate) borate.

9. The secondary battery according to claim 7, wherein
the lithium salt contains at least one selected from the group consisting of $LiBF_4$, $LiPF_6$, $LiN(SO_2CF_3)_2$, $LiN(SO_2F)_2$, a lithium bis(oxalate) borate, and a lithium difluoro(oxalate) borate.

10. The secondary battery according to claim 8, wherein
the lithium salt in the non-aqueous electrolyte has a concentration of not less than 0.5 mol/L and not more than 3.5 mol/L.

11. The secondary battery according to claim 9, wherein
the lithium salt in the non-aqueous electrolyte has a concentration of not less than 0.5 mol/L and not more than 3.5 mol/L.

12. The cathode active material according to claim 1, wherein $\gamma=0$.

13. The cathode active material according to claim 1, wherein
an upper limit of the carbon number of the saturated aliphatic group is three.

14. The cathode active material according to claim 1, wherein $\gamma>0$.

15. The cathode active material according to claim 1, wherein the coating layer consists of the ammonium phosphate compound.

* * * * *